United States Patent [19]

Sears

[11] Patent Number: 5,671,543
[45] Date of Patent: Sep. 30, 1997

[54] TAPE MEASURE MARKING DEVICE AND METHOD FOR USE THEREOF

[76] Inventor: Todd A. Sears, 355 W. Dartmouth, Gladstone, Oreg. 97207

[21] Appl. No.: 473,716

[22] Filed: Jun. 7, 1995

[51] Int. Cl.$^6$ ............................ B25H 7/04; G01B 3/10
[52] U.S. Cl. ................................................. 33/668; 33/768
[58] Field of Search .......................... 33/755, 757, 759, 33/760, 761, 768, 770, 668

[56] References Cited

U.S. PATENT DOCUMENTS

| | | |
|---|---|---|
| D. 255,881 | 7/1980 | Atienza . |
| 421,133 | 2/1890 | Grierson ................................. 33/768 |
| 720,507 | 2/1903 | Van Horn . |
| 1,470,470 | 10/1923 | Pas . |
| 1,613,676 | 1/1927 | Raphael . |
| 2,305,065 | 12/1942 | Corkish . |
| 2,624,120 | 1/1953 | Mills . |
| 2,651,843 | 9/1953 | Goodford . |
| 2,759,696 | 8/1956 | Nelson . |
| 2,807,886 | 10/1957 | Aciego . |
| 2,847,765 | 8/1958 | Bateman . |
| 2,942,348 | 6/1960 | Caruso . |
| 3,021,599 | 2/1962 | Odom . |
| 3,045,788 | 7/1962 | Cederholm . |
| 3,063,157 | 11/1962 | Keene . |
| 3,100,941 | 8/1963 | Taylor . |
| 3,148,455 | 9/1964 | Aciego . |
| 3,157,950 | 11/1964 | Duncan . |
| 3,262,211 | 7/1966 | Beckett ................................. 33/761 |
| 3,336,678 | 8/1967 | Chamberlain . |
| 3,371,389 | 3/1968 | King . |
| 3,479,742 | 11/1969 | Starkenberg . |
| 3,526,964 | 9/1970 | Clark, Jr. . |
| 3,744,134 | 7/1973 | Zima, Jr. . |
| 3,802,083 | 4/1974 | Freed . |
| 4,071,957 | 2/1978 | Sumption et al. . |
| 4,296,554 | 10/1981 | Hammerstrom . |
| 4,439,929 | 4/1984 | Kitagawa et al. . |
| 4,542,589 | 9/1985 | Yamamoto . |
| 4,580,347 | 4/1986 | McKnight . |
| 4,630,376 | 12/1986 | Pentecost . |
| 4,744,150 | 5/1988 | Horvath . |
| 4,760,648 | 8/1988 | Doak et al. . |
| 4,964,225 | 10/1990 | Waldherr . |
| 4,965,941 | 10/1990 | Agustinacci . |
| 5,134,784 | 8/1992 | Atienza . |
| 5,154,006 | 10/1992 | Wooster . |
| 5,230,159 | 7/1993 | Lipsey ................................. 33/68 |
| 5,295,308 | 3/1994 | Stevens et al. . |
| 5,477,619 | 12/1995 | Kearns ................................. 33/668 |

FOREIGN PATENT DOCUMENTS

170114   1/1960   Sweden .................................. 33/761

*Primary Examiner*—G. Bradley Bennett
*Attorney, Agent, or Firm*—William A. Birdwell & Associates

[57] ABSTRACT

A tape measure marking device and method for use thereof in which a C-member is removably attached to the tape case across a narrow dimension thereof, by an existing screw in the tape case being inserted through the C-member. The C-member includes an implement holding member projecting to a side of the tape case, the implement holding member providing for releasably attaching a marking or cutting implement to the tape case. The C-member further includes an indexing member disposed across a substantial portion of an extensible tape being extended from the tape case and the implement holding member provides for centering marking implements having different sizes and shapes to register with the indexing member.

23 Claims, 4 Drawing Sheets

TAPE MEASURE MARKING DEVICE AND METHOD FOR USE THEREOF

TECHNICAL AREA

This invention relates to devices, and methods for use thereof, for marking a surface when measuring with a tape. The invention particularly relates to such devices, and methods for use thereof, attachable to the case of an extensible tape measure wherein the device is adapted for holding a variety of shapes and sizes of marking implements.

BACKGROUND OF THE INVENTION

Carpenters and others working with tape measures have a need for marking a measured dimension on a surface measured. With only a tape measure and a marking implement, such as a pencil, measuring and marking will generally require three hands; one to hold one end of the tape, another to hold the other end of the tape, and a third to hold the marking implement. While sometimes one end of the tape may be held in place by catching the oft-provided lip of a stiff, extensible tape over an edge composing one end-point of the measurement, this is not always convenient or possible. It is, of course, desirable to free, to the extent possible, the carpenter or other user of the tape measure from the need to grasp a multiplicity of items.

Accordingly, numerous devices incorporating a marking implement into a tape measure have been attempted. Some of these devices have been affixed to existing tape measure cases, while others are integral with the tape measure case. Devices attaching to an existing tape measure, while of help in addressing the foregoing need, exhibit deficiencies.

As an example, Doak et at., U.S. Pat. No. 4,760,648, proposes attaching an implement holding device to a standard case for an extensible tape measure by removing a screw-attached clip located centrally on the side of such a case to reveal a recessed area, fitting a portion of the device into the recess and attaching it to the case with the removed screw. A problem with this attachment scheme is that not all cases for extensible tape measures are fitted with such a recess. Another problem is that the marking implement must be held at a substantial distance from the point of attachment so that substantial torque may be applied to the attachment tending to stress the device and allow movement of the marking implement held thereby.

Freed, U.S. Pat. No. 3,802,083, proposes a means for attaching such a device to the case of a tape measure by an adhesive. However, the strength and reliability of an adhesive joint is not believed to be satisfactory for many situations which a tape measure marking device may encounter and, moreover, a device attached by an adhesive cannot be readily removed.

Yet another means for attaching such a device to the case of a tape measure is by frictional contact between a holder of spring material and the tape case, as proposed by Aciego, U.S. Pat. No. 3,148,455. A well known problem with spring attachments generally is that devices that are attached by spring pressure can often pop off when that is not desired. Another problem is that springs flex, allowing undesired movement in the device relative to the tape case.

A particularly sturdy means of attaching a holder to a tape measure case is proposed by Chamberlain et al., U.S. Pat. No. 3,336,678. A marking attachment is clamped to a tape case disposed between front and rear transverse arms along the long dimension thereof by a hand operated thumbscrew threaded into the rear arm for exerting pressure against the case. However, the marking attachment, though strong, is particularly bulky and heavy.

It is desirable that attachable marking devices accommodate a number of different marking implements. Some designs, for example that proposed in Chamberlain, hold, permanently, only one kind of implement, while others, for example Aciego and Doak, provide for interchangeable implements, so long as the implements are of substantially circular cross-section. Wooster, U.S. Pat. No. 5,154,006, proposes a triangular spring clip which is claimed to hold a marking implement of rectangular cross-section in addition to one of circular cross-section, such as a carpenter's pencil; however, it is apparent that the grip provided thereby is not particularly resistant to downward marking motion, so that the implement will be susceptible to movement when utilized for marking. Another problem with the triangular spring clip of Wooster is that the center of a pencil lead, whether the pencil is circular or rectangular, will be held at a different location with respect to the tape measure depending on the diameter or width of the pencil. Thence, there is a need for an improved mechanism for accommodating a number of different marking implements.

A drawback of many devices, such as those proposed in Wooster, Aciego and Hammerstrom, U.S. Pat. No. 4,296,554, that provide for interchangeable marking implements that wear, such as pencils or crayons, is that the marking implement is disposed at an angle from the vertical. With the pencil, or crayon angled from the vertical, the spot of marking will not only widen but its center will move, thus bringing the spot out of alignment with any indexing device with which the pencil was originally aligned with.

It is also desirable in an attachable marking device to provide for ready height adjustment as the marking implement wears. Some devices, such as those proposed in Chamberlain and Freed, provide for depression of a marking implement, which may be a punch or other nonwearing implement or a lead, against a spring bias to mark a single point. The spring bias naturally returns the marking implement to a retracted position. Height adjustment is therefore not necessary, but the use of a single point to effect a marking is a limiting feature of such devices.

Other devices, such as those proposed in Wooster, Aciego and Hammerstrom, contemplate the manipulation of the tape case in order to effect a linear mark similar to that which would otherwise be made manually with a pencil or scribe. To allow for this improved marking capability as well as the desired improvement in marking facility generally, a normally wearing marking implement, such as a crayon or pencil, is intended to be held substantially rigidly to the device. Normally this has been attempted by a gripping means comprising a spring to provide frictional force against the marking implement. A marking implement held by frictional force against a spring, however, has a limited resistance to sliding in the device. Since marking force is applied upwardly, this may have provided an impetus to orient the implement away from the vertical. Height adjustment in these devices is not sturdily maintained.

Carpenter's tape measures are often provided with a pouch or holder to attach to a belt, for conveniently holding and carrying the tape when it is not in immediate use. It is desirable that an attachable device for holding a marking implement to the tape allow the tape with the device attached to fit within the standard pouch or holder. Among other things, this generally requires that the device not add thickness to the tape case in the vicinity of the center thereof. Known devices such as those proposed by Chamberlain, Wooster and Hammerstrom, appear not to meet this requirement. Moreover, protrusion from the tape case must be limited so that the tape may clear the entry aperture of the pouch or holder which is generally located at substantially more than half of the height of the tape case when it is seated in the pouch or holder.

It is also desirable that a marking implement holder provide an easily readable indexing member to which the marking implement is aligned for marking at the indicated measurement. Many such devices do not include provision for indexing at all. Others, such as that proposed by Doak, provide such a provision for indexing that is small and offset from the tape, making it difficult to read and difficult to align with the marks on the tape.

Accordingly, there is a need for a novel and improved tape measure marking device and method for use thereof.

SUMMARY OF THE INVENTION

The tape measure marking device and method for use thereof of the present invention solves the aforementioned problems and meets the aforementioned needs by employing a substantially rigid C-member, oriented across and conforming to the narrow dimension of a tape case to which the C-member is attached, the C-member being removably attached to the tape case above a tape exit thereof. The C-member includes a mounting aperture located through a first transverse arm of the C-member so that the mounting aperture is substantially coaxial with an existing hole in the tape case when the marking implement holder is brought into place for attachment to the tape case, thereby allowing an existing screw in the tape case to be removed and reinserted into the existing hole through the mounting aperture, for attaching the marking implement holder to the tape measure. The C-member further includes an implement holding member projecting to a side of the tape case, the implement holding member having a marking implement aperture, the marking implement aperture having an axis aligned adjacent and substantially perpendicular to the surface of an extensible tape provided at the tape exit of the tape case, for holding a marking implement in a substantially perpendicular orientation with respect to a surface to be marked thereby.

It is another aspect of the invention that the marking implement aperture includes, in a wall portion thereof, a plurality of jaws coplanar with the axis, the jaws defining a substantially "V" shaped cross-section. The marking implement aperture further includes, across from the wall portion, an implement clamping opening, for receiving an implement clamping member. The implement clamping member includes a threaded body having a plurality of jaws at an end thereof. The jaws are coplanar with the axis of the marking implement aperture, the jaws defining a substantially "V" shaped cross-section, the jaws of the implement clamping member facing in opposition to the jaws of the wall portion of the marking implement aperture.

It is yet another aspect of the invention that the implement holding member includes a threaded receptacle threadably engaging the implement clamping member, for carrying the implement clamping member and for adjusting penetration of the implement clamping member into the marking implement aperture through the implement clamping opening. A marking implement is, thence, releasably clamped between the jaws of the marking implement aperture and the jaws of the implement clamping member by rotating the threaded receptacle engaging the implement clamping member.

Still another aspect of the present invention provides that the C-member further includes an indexing member for aligning the implement holding member to the tape case such that a marking implement held therein is alignable with measurement marks on the extensible tape. The indexing member depends from the C-member and includes an indexing edge defining a line that is colinear with the direction of measurement marks on the extensible tape and which intersects a centroidal axis of the marking implement clamped within the marking implement aperture. The indexing edge spans a substantial portion of the narrow dimension of the tape case, has minimal thickness, and is spaced closely to the surface of the tape when it is withdrawn from the tape case, to minimize parallax.

Therefore, it is a principal object of the present invention to provide a novel and improved tape measure marking device and method for use thereof.

It is another object of the present invention to provide such a marking implement holder having a sturdy and reliable attachment to the tape measure.

It is yet another object of the present invention to provide such a marking implement holder capable of accommodating different sizes and shapes of marking implements.

It is still another object of the present invention to provide such a marking implement holder capable of holding the different sizes and shapes of marking implements so that the center of leads therein is retained at the same location with respect to the tape measure.

It is a further object of the present invention to provide such a marking implement holder having a sturdy and reliable means of gripping a marking implement held thereby.

It is still a further object of the present invention to provide a marking implement holder capable of easy and reliable setting and maintaining of the height of the marking implement held thereby.

It is yet a further object of the present invention to provide such a marking implement holder allowing the tape measure having the holder attached to be carried in a pouch or holder provided with the tape measure.

It is yet a further object of the present invention to provide a marking implement holder having a large and easily read indexing means that minimizes parallax.

The foregoing and other objects, features and advantages of the present invention will be more easily understood upon consideration of the following detailed description of the invention, taken in conjunction with the accompanying drawings.

DETAILED DESCRIPTION OF A PREFERRED EMBODIMENT

Figure 1A:
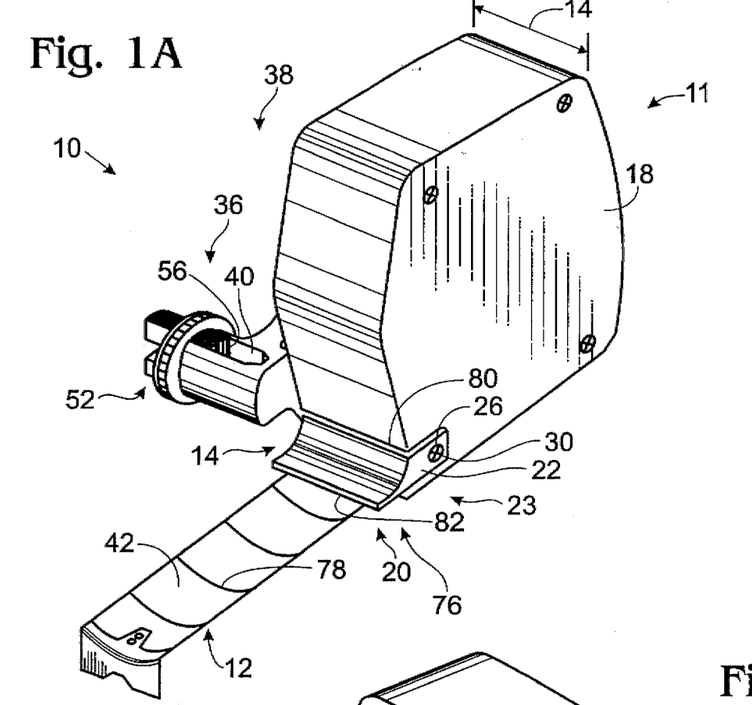
FIG. 1A is a perspective view of one side of a tape measure marking device according to the present invention.
Figure 1B:
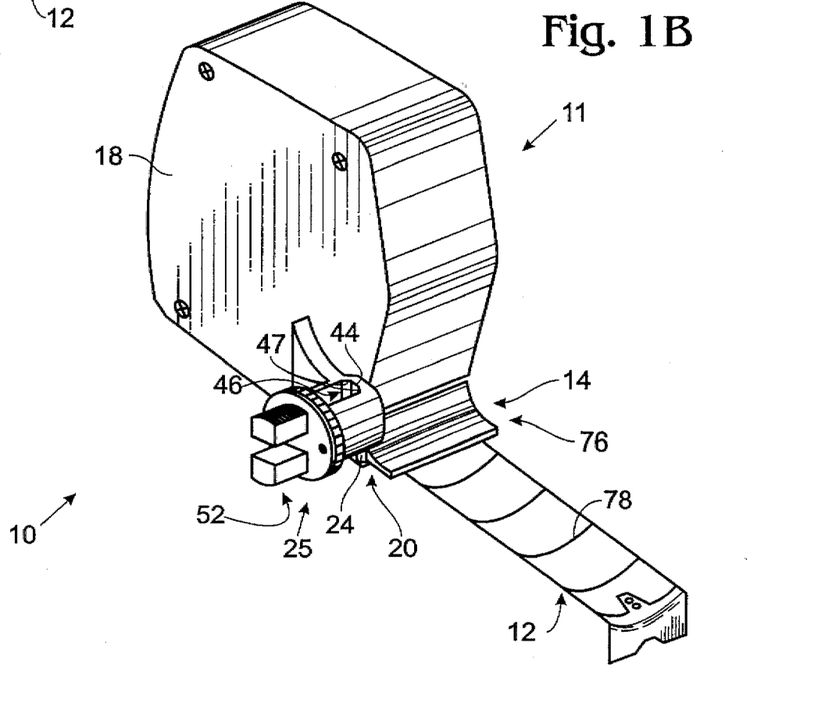
FIG. 1B is a perspective view of another side of the device of FIG. 1A.

Referring to FIGS. 1A and 1B, a preferred embodiment of a tape measure marking device 10 according to the present invention utilizes generally a tape measure 11 having an extensible tape 12 and includes a substantially rigid C-member 14 oriented across and conforming to the dimension 14 of a tape case 18 of the tape measure 11 at which is disposed a tape exit 20 for the extensible 12. The dimension 14 is generally the narrow dimension of the tape case 18, the dimension 14 being substantially perpendicular to a direction of extension of the extensible tape 12. The C-member 14 is removably attachable to the tape case 18 above the tape exit 20 of the extensible tape 12. The C-member 14 is preferably cast or molded.

The C-member 14 includes a first transverse arm 22 at a first end 23 and a second transverse arm 24 at a second end 25. The first transverse arm 22 includes a mounting aperture 26 therein. The mounting aperture 26 aligns to be substantially coaxial with an existing hole 28 (not shown) in the tape case 18, when the marking implement holder 10 is brought into alignment for attachment thereto, thereby allowing an existing screw 30 in the tape case to be removed and reinstalled into the existing hole 28 through the mounting aperture 26, for attaching the marking implement holder to the tape measure. A tape case 18 having an existing hole 28 and an existing screw 30 is, for example, that manufactured by Stanley Co. as "STANLEY CONTRACTOR GRADE," model 33-445.

Figure 3:
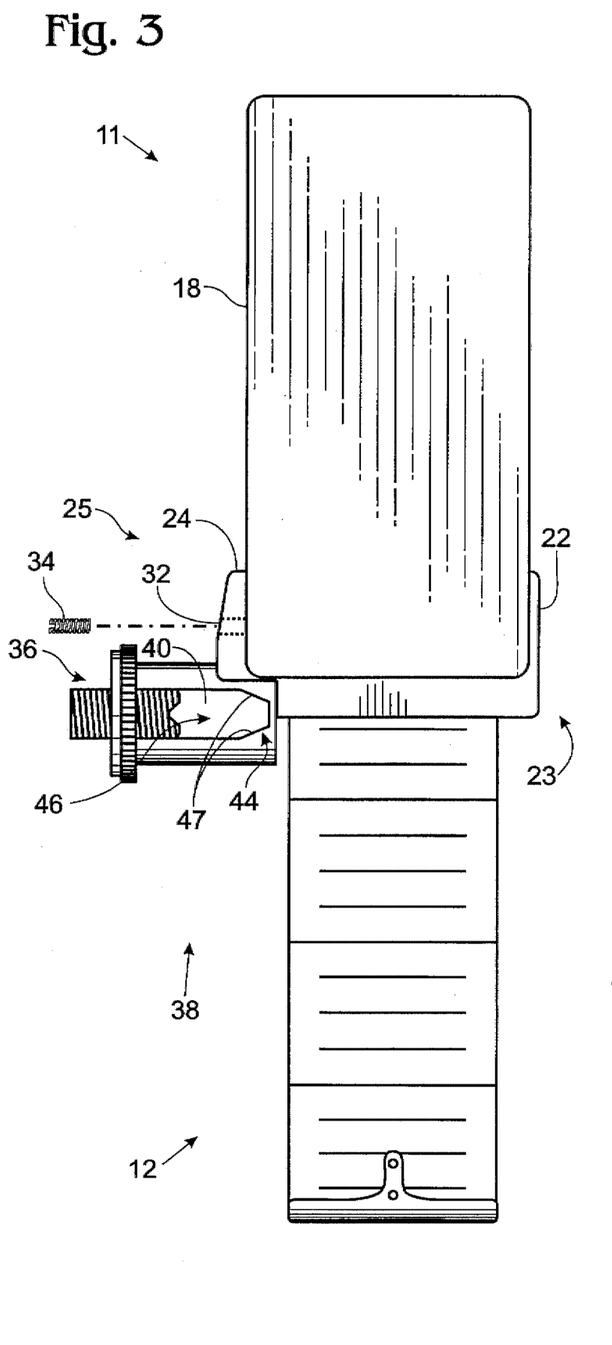
FIG. 3 is a top view of the device of FIG. 1A.

Referring to FIG. 3, the second transverse arm 24 may include a threaded hole 32 for installation of a set-screw 34 or the like. Thence, additional strength in the attachment of the C-member 14 to the tape case 18 may be obtained by tightening the setscrew 34 against the tape case 18.

Returning to FIGS. 1A and 1B, the C-member 14 further includes an implement holding member 36 extending from the C-member 14 at the second transverse arm 24 thereof and projecting to a side 38 of the tape case 18. The implement holding member 36 may alternatively extend from the C-member 14 at the first transverse arm 22, so long as access to the existing screw 30 is also provided.

The implement holding member 36 includes a marking implement aperture 40 having an axis aligned adjacent and substantially perpendicular to the top surface 42 of the extensible tape 12 as it is withdrawn from the tape case 18.

Figure 2:
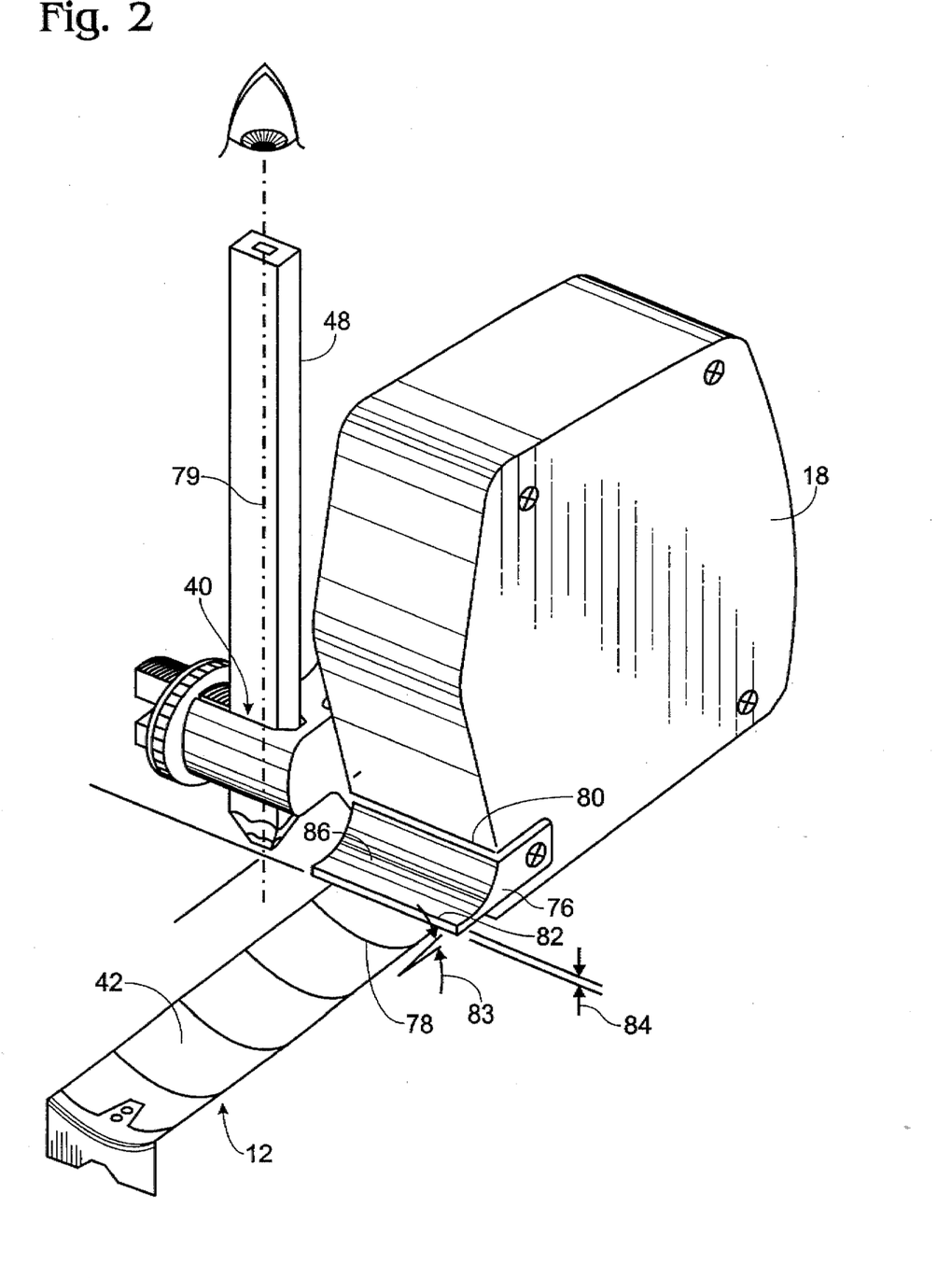
FIG. 2 is a perspective view of the device of FIG. 1A having a marking implement attached thereto.

Referring to FIGS. 1B, 2 and 3, the marking implement aperture 40 includes, in a wall portion 44 thereof adjacent the tape case 18, a plurality of first jaws 46 coplanar with the axis thereof, the first jaws 46 defining a substantially "V" shaped cross-section, for gripping a marking implement 48 inserted through the aperture 40. The marking implement 48 may be any implement with which a mark may be left on a surface to be measured, e.g., a pencil, crayon, pen, scribe, punch, etc. The marking implement 48 may also be an implement for cutting the surface to be measured, such as a cutting blade. Preferably, the first jaws 46 have two substantially flat surfaces 47 comprising legs of the "V" and thereby are angled with respect to each other. Preferably, the included angle is substantially about 45 degrees.

Figure 4A:
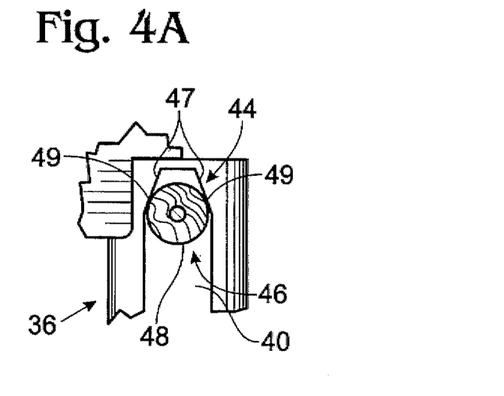
FIG. 4A is a top view of a first jaw detail of FIG. 3 in conjunction with a first size of a marking implement.
Figure 4B:
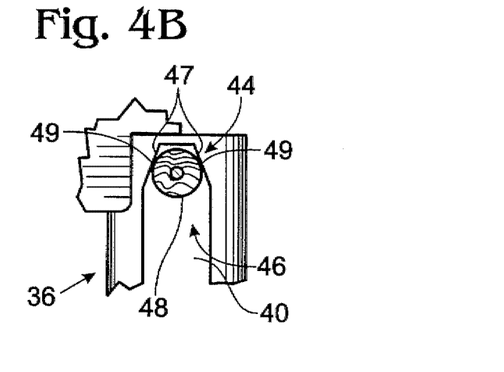
FIG. 4B is a top view of a first jaw detail of FIG. 3 in conjunction with a second size of a marking implement.
Figure 4C:
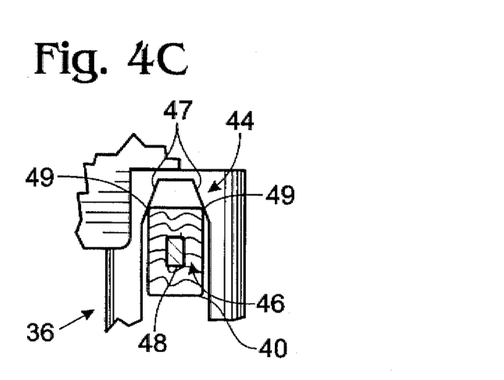
FIG. 4C is a top view of a first jaw detail of FIG. 3 in conjunction with a second shape of a marking implement.

Referring to FIGS. 4A, 4B and 4C, the first jaws 46 make contact with the marking implement 48 at a plurality of points 49 thereon, thereby accommodating different or varying cross-sectional shapes of the marking implement 48. Further, for bilaterally symmetrical cross-sectional shapes, the first jaws 46 will tend to automatically center the marking implement 48, within the marking implement aperture 40, along a direction substantially perpendicular to the dimension 14 of the tape case 18. This allows marking implements 48 having differing shapes to be automatically aligned with the extensible tape 12 as will be described below.

Referring to FIG. 4A, a circular cross-section of the marking implement 48 is shown against a preferred embodiment of the first jaws 46. With reference to FIG. 4B, a smaller circular cross-section of the marking implement 48 is depicted. With reference to FIG. 4C, a rectangular cross-section of a marking implement 48 such as a carpenter's pencil is depicted. While a preferred configuration of the first jaws 46 is shown in FIGS. 4A, 4B and 4C, each having two points 49 of contact, variations thereof may be utilized without departing from the principles of the present invention.

Figures 5, 6:
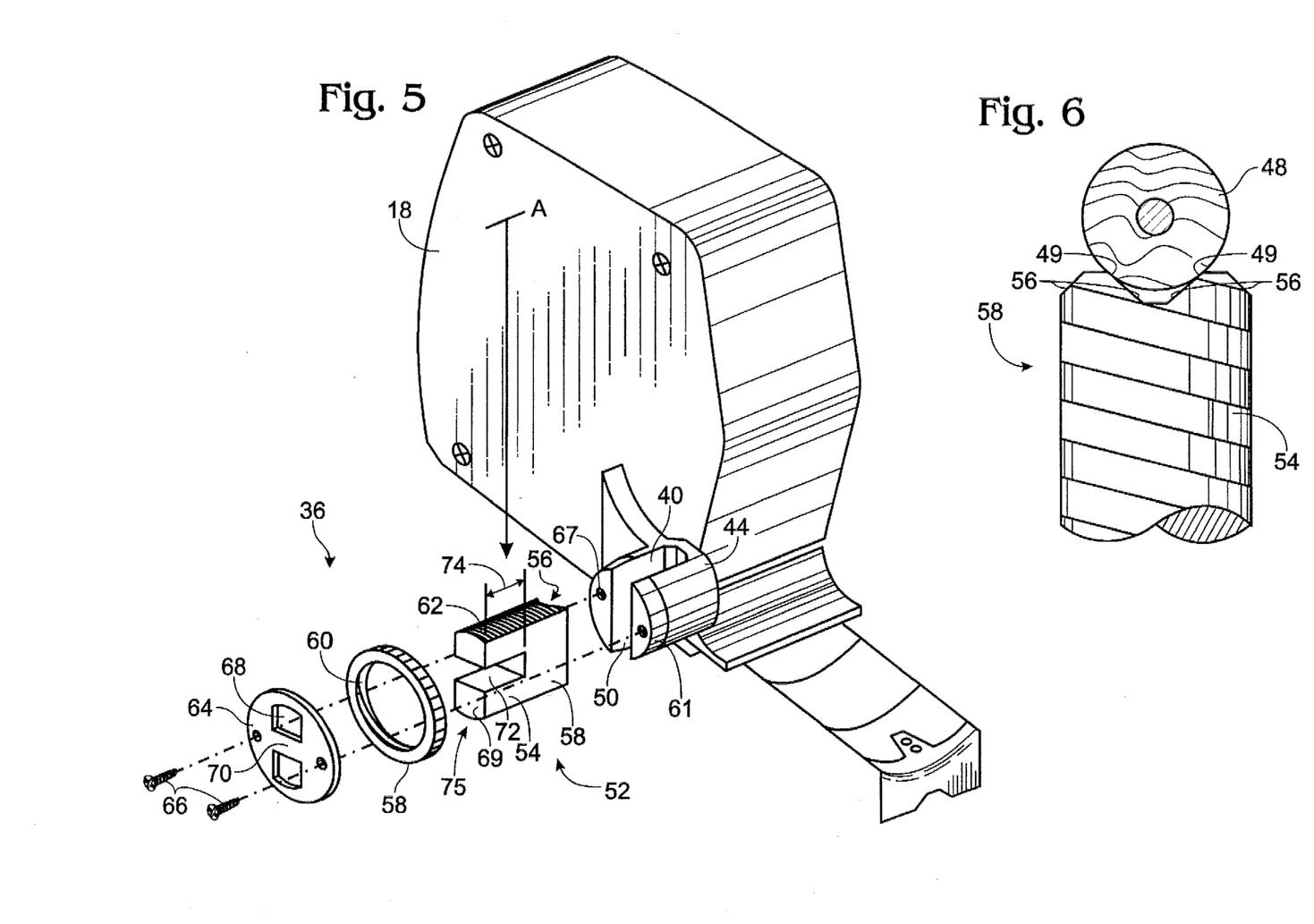
FIG. 5 is an exploded view of the device of FIG. 1A.
FIG. 6 is a top view indicated as "A" in FIG. 5, of a second jaw detail of the device of FIG. 1A.

Referring to FIGS. 5 and 6, the marking implement aperture 40 further includes, across from the wall portion 44, an implement clamping opening 50, for receiving an implement clamping member 52.

The implement clamping member 52 includes a tubular threaded body 54 having a plurality of second jaws 56 at an end 58 thereof, the second jaws 56 being coplanar with the axis of the marking implement aperture 40. The second jaws 56 include a substantially "V" shaped cross-section, the second jaws 56 of the implement clamping member 52 facing in opposition to the first jaws 46 of the wall portion 44 of the marking implement aperture 40.

The second jaws 56, like the first jaws 46, make contact with the marking implement 48 at a number of points 49 thereon, thereby accommodating different cross-sectional shapes of the marking implement 48. Further, for bilaterally symmetrical cross-sectional shapes, the second jaws 56 will tend to automatically center the marking implement 48 within the marking implement aperture 40, along a direction substantially perpendicular to the dimension 14 of the tape case 18. This allows marking implements 48 having differing shapes to be automatically aligned with the extensible tape 12 as will be described below.

Referring to FIG. 5, a preferred structure for the second jaws 56 is shown in detail, though it should be recognized that many variations of the second jaws 56, as for the first jaws 46, may be made without departing from the principles of the present invention. Particularly, the second jaws 56 may consist of the same structure as aforedescribed in connection with the first jaws 46.

The implement holding member 36 includes a threaded receptacle ring 58 having internal threads 60 threadably engaging external threads 62 of the implement clamping member 52. The ring 58 carries the implement clamping member 52. The ring 58 is also rotatable about the threaded body 54, for adjusting, according to the degree of rotation of the ring 58, penetration of the implement clamping member 52 into the marking implement aperture 40 through the implement clamping opening 50. The marking implement 48 may thence be releasably clamped between the jaws 46 of the marking implement aperture 40 and the jaws 56 of the implement clamping member 52 by rotating the threaded receptacle ring 58 engaging the tubular threaded body 54 of the implement clamping member 52. The degree of clamping force thereby provided will be substantially proportional to the degree of rotation of the ring 58 once it is seated against the marking implement 48.

The threaded receptacle ring 58 is carried on the marking implement holding member 36 in a circumferential channel 61 therein and is captured by a stop 64 capping the implement clamping opening 50 over the receptacle ring 58. The stop 64 may be attached to the marking implement holding member 36 at the implement clamping opening 50 with small screws 66 threadably engaged into the implement holding member at holes 67. The stop 64 includes stop apertures 68 for allowing portions 69 of the tubular threaded body 54 to extend beyond the stop 64 so as to allow for a range of penetration of the threaded body 54 into the implement clamping aperture 50.

The stop apertures 68 are separated by a wall portion 70 of the stop 64. The tubular threaded body 54 includes a transverse channel 72 extending a selected depth 74 thereinto from a body portion end 75 thereof. The wall portion 70 is disposed within the channel 72 and thereby prevents the tubular threaded body 54 from becoming detached from the marking implement holding member 36. The depth 74 of the channel 72 is selected to allow the body 54 to withdraw around the wall portion 70 sufficiently to accommodate the widest marking implement 48 contemplated to be held in the marking implement aperture 40 by the marking implement holder 10.

It is emphasized that the tubular threaded body 54 and the threaded receptacle ring 58 are a preferred embodiment of a means of threadably adjusting the penetration of the marking implement aperture 40 by the implement clamping member 52. Variations of the threaded body 54 and the threaded receptacle 58 may be made without departing from the principles of the present invention. For example, the threaded receptacle 58 may be fixed and not rotatable, while the threaded body 54 may be rotatable and provide for fixed jaws 56 by including a rotatable joint therebetween.

Referring again to FIGS. 1A and 1B, the C-member 14 still further includes an indexing member 76 for aligning the implement holding member 36 to the tape case 18 such that a marking implement held therein is alignable with measurement marks 78 on the extensible tape 12. The first jaws 46 and the second jaws 56 function to center the marking implement 48 (see FIG. 2) in the marking implement aperture 40 as aforedescribed. Alignment of the implement holding member 36 with the measurement marks 78 of the extensible tape 12, by use of the indexing member 76, thence also aligns the marking implement 48 thereto as well.

Referring to FIG. 2, the indexing member 76 extends from the C-member 14 at a front portion 80 thereof and includes an indexing edge 82 defining a line that is colinear with the direction of the measurement marks 78 and which intersects the centroidal axis 79 of the marking implement 48 clamped within the marking implement aperture 40. The indexing edge 82 spans a substantial portion of the dimension 14 of the tape case 18, has minimal thickness 84, and is spaced closely to the surface of the extensible tape 12 when it is withdrawn from the tape case 18, to minimize parallax. A preferred embodiment of the indexing member 76 includes a concave surface 86. The surface 86 is substantially parallel to the line of sight of a user of the tape 12 when making a measurement therewith, at the junction 88 between the indexing member 76 and the C-member from which it extends. The surface 86 thence curves toward the indexing edge 82, so as to terminate there at a substantially about forty-five degree angle of rise 83 with respect to the top surface 42 of the extensible tape 12. Curvature of the concave surface 86 may be a simple radius. It has been found that the surface 86, as aforedescribed, facilitates the user's alignment of the indexing edge 82 to the measurement marks 78 on the extensible tape 12.

It is to be recognized that, while a specific embodiment of tape measure device and method for use thereof has been shown and described as preferred, related configurations and methods could be utilized without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

I claim:

1. A marking device for use with a tape measure having an extensible tape, a first side and a second side, a front and a bottom, and an opening between the first side and the second side disposed substantially at the juncture of the front and the bottom, through which the tape extends, comprising:

a substantially rigid C-member for removable attachment to the tape measure, said C-member having a central portion and two side portions disposed at opposite ends of said central portion for attaching said central portion to the tape measure adjacent the front of the tape measure immediately above the opening between the first side and the second side, said central portion of said C-member having an indexing portion for identifying a position on the tape; and a marking implement holding member extending from one said side portion of said C-member, said marking implement holding member being adapted to hold a marking implement having a marking tip so that the center of said marking tip is laterally aligned with said indexing portion.

2. The marking device of claim 1, wherein said indexing portion comprises an edge of said central portion extending substantially from side to side thereof in a direction substantially perpendicular to the direction of extension of the tape.

3. The marking device of claim 1, wherein, when the device is mounted on a tape measure, said central portion has an upper front portion spaced upwardly away from the tape and a lower front portion spaced outwardly away from the tape measure and said central portion includes a concave surface between said upper front portion and lower front portion of said central portion, thereby forming said indexing portion at said lower front portion of said central portion.

4. The marking device of claim 3, wherein said indexing portion comprises an edge of said lower front portion of said central portion extending substantially from side to side thereof in a direction perpendicular to the direction of extension of the tape.

5. The marking device of claim 1, wherein said marking implement holding member includes a marking implement alignment member which holds a marking implement having an elongate dimension so that said elongate dimension is substantially perpendicular to the direction of extension of the tape.

6. The marking device of claim 1, wherein an aperture is formed in one side of said C-member for receiving a threaded fastener to fasten said C-member to the tape measure.

7. The marking device of claim 1, wherein a threaded aperture is formed in one side of said C-member for receiving a threaded member to fasten said C-member to the tape measure by lateral pressure.

8. The marking device of claim 1, wherein said marking implement holding member includes a marking implement alignment member which holds a marking implement having an elongate dimension so that said elongate dimension is substantially perpendicular to the direction of extension of the tape, said marking implement alignment member having a marking implement clamping member and a marking implement clamping opening for receiving said clamping member.

9. The marking device of claim 8, wherein said marking implement clamping opening includes a wall portion disposed across from said marking implement clamping opening and wherein said marking implement clamping opening includes a plurality of jaws in said wall portion, said jaws defining a substantially "V" shaped cross-section so that said elongate dimension of said marking implement is held substantially perpendicular to and makes at least two symmetric contact points with said "V" shaped cross-section for securely gripping said marking implement when inserted therein.

10. The marking device of claim 1, wherein said indexing portion comprises an edge of said central portion extending substantially from side to side thereof in a direction substantially perpendicular to the direction of extension of the tape; when the device is mounted on a tape measure, said central portion has an upper front portion spaced upwardly away from the tape and a lower front portion spaced outwardly away from the tape measure, and said central portion includes a concave surface between said upper front portion and said lower front portion of said central portion, thereby forming said indexing portion at said lower front portion of said central portion; and said marking implement holding member includes a marking implement alignment member which holds a marking implement having an elongate dimension so that said elongate dimension is substantially perpendicular to the direction of extension of the tape.

11. The marking device of claim 1, wherein each said side portion includes a mechanism for securing said side portion to the respective side of the tape measure.

12. A marking device for use with a tape measure having an extensible tape, a first side and a second side, and an opening between the first side and the second side through which the tape extends, comprising:

a substantially rigid C-member having a central portion and two side portions and being adapted to be removably attachable to the tape measure so that said central portion is disposed between the first side and the second side, and said two side portions are disposed respectively adjacent the first side and the second side of the tape measure, said central portion of said C-member having an indexing portion for identifying a position on the tape;

a marking implement holding member extending from one side of said C-member, said marking implement holding member comprising a marking implement alignment member having a marking implement clamping member and a marking implement clamping opening for receiving said clamping member, wherein said marking implement holding member is adapted to hold a marking implement having a marking tip so that the center of said marking tip is laterally aligned with said indexing portion and having an elongate dimension so that said elongate dimension is substantially perpendicular to the direction of extension of the tape; and said marking implement clamping opening includes a wall portion disposed across from said marking implement clamping opening, wherein said marking implement clamping opening includes a plurality of first jaws in said wall portion, said first jaws being substantially coplanar with an axis of said marking implement clamping opening, said first jaws defining a substantially "V" shaped cross-section, and wherein said marking implement clamping member includes a threaded body, said threaded body having a plurality of second jaws at an end thereof, said second jaws being substantially coplanar with the axis of said marking implement clamping opening, said second jaws defining a substantially "V" shaped cross-section, said second jaws being disposed in opposition to said first jaws for gripping said marking implement when inserted into said marking implement clamping opening.

13. A marking device for use with a tape measure having an extensible tape, a first side and a second side, and an opening between the first side and the second side through which the tape extends, comprising:

a substantially rigid C-member having a central portion and two side portions and being adapted to be removably attachable to the tape measure so that said central portion is disposed between the first side and the second side, and said two side portions are disposed respectively adjacent the first side and the second side of the tape measure, said central portion of said C-member having an indexing portion for identifying a position on the tape;

a marking implement holding member extending from one side of said C-member, said marking implement holding member comprising a marking implement alignment member having a marking implement clamping member and a marking implement clamping opening for receiving said clamping member, wherein said marking implement holding member is adapted to hold a marking implement having a marking tip so that the center of said marking tip is laterally aligned with said indexing portion and having an elongate dimension so that said elongate dimension is substantially perpendicular to the direction of extension of the tape; and said marking implement holding member includes a threaded receptacle threadably engaging said marking implement clamping member, for carrying said marking implement clamping member and for adjusting penetration of said marking implement clamping member into said marking implement aperture through said marking implement clamping opening.

14. The marking device of claim 13, wherein said threaded receptacle is a rotatable ring having internal threads, said marking implement clamping member includes a tubular body having external threads, and said rotatable ring threadingly engages said external threads of said tubular body and rotates therearound.

15. The marking device of claim 14, wherein said marking implement holding member includes a stop disposed over said clamping opening and a circumferential channel adjacent said stop, wherein said rotatable ring is carried by said channel and is captured by said stop.

16. The marking device of claim 15, wherein said tubular body includes a transverse channel extending from an end thereof and said stop includes a wall portion and an aperture, said wall portion being disposed within said transverse channel and said tubular body having a portion thereof extending through said aperture.

17. A marking device for use with a tape measure having an extensible tape, a first side and a second side, and an opening between the first side and the second side through which the tape extends, comprising:

a substantially rigid C-member having a central portion and two side portions and being adapted to be removably attachable to the tape measure so that said central portion is disposed between the first side and the second side, and said two side portions are disposed respectively adjacent the first side and the second side of the tape measure, said central portion of said C-member having an indexing portion for identifying a position on the tape;

a marking implement holding member extending from one side of said C-member, said marking implement holding member comprising a marking implement alignment member having a marking implement clamping member and a marking implement clamping opening for receiving said clamping member, wherein said marking implement holding member is adapted to hold a marking implement having a marking tip so that the center of said marking tip is laterally aligned with said indexing portion and having an elongate dimension so that said elongate dimension is substantially perpendicular to the direction of extension of the tape; and said making implement clamping opening includes a wall portion disposed across from said marking implement clamping opening, wherein said marking implement clamping opening includes a plurality of first jaws in said wall portion, said first jaws defining a substantially "V" shaped cross-section, and said marking implement clamping member includes a threaded body, said threaded body having a plurality of second jaws at an end thereof, said second jaws defining a substantially "V" shaped cross-section, said second jaws being disposed in opposition to said first jaws for gripping said marking implement when inserted into said marking implement clamping opening.

18. A method for attaching a marking implement to a tape measure marking device, comprising the steps of:

inserting a marking implement into a marking implement holder having a marking implement aperture for receiving the marking implement; and rotating a threaded ring about a threaded body wherein said threaded body threadably engages said ring to penetrate said marking implement aperture in accordance with the degree of rotation thereof, for clamping the marking implement within the marking implement aperture.

19. The method of claim 18, further comprising the steps of removing an existing screw from an existing hole in the tape measure, aligning with said existing hole a marking device for use with a tape measure comprising a substantially rigid C-member having a central portion and two side portions and being adapted to be removably attachable to the tape measure so that said central portion is disposed adjacent an opening of the tape measure, and reinstalling said existing screw through said mounting aperture and thence into said existing hole.

20. The method of claim 18, further comprising the step of automatically centering said marking implement within said marking implement aperture, wherein the marking implement may be of varying cross-sectional sizes and shapes.

21. A marking device for use with a tape measure having an extensible tape, a first side and a second side, and an opening between the first side and the second side through which the tape extends, comprising:

a substantially rigid C-member having a central portion and two side portions and being adapted to be removably attachable to the tape measure so that said central portion is disposed between the first side and the second side, and said two side portions are disposed respectively adjacent the first side and the second side of the tape measure, said central portion of said C-member having an indexing portion for identifying a position on the tape;

a marking implement holding member extending from one side of said C-member, said marking implement holding member comprising a marking implement alignment member having a marking implement clamping member and a marking implement clamping opening for receiving said clamping member, wherein said marking implement holding member is adapted to hold a marking implement having a marking tip so that the center of said marking tip is laterally aligned with said indexing portion and having an elongate dimension so that said elongate dimension is substantially perpendicular to the direction of extension of the tape; and said marking implement clamping member includes a threaded body, said threaded body having a plurality of jaws at an end thereof, said jaws defining a substantially "V" shaped cross-section for gripping said marking implement when inserted into said marking implement clamping opening.

22. A method for attaching a tape measure marking device to a tape measure, comprising the steps of:

removing an existing screw from an existing hole in the tape measure;

aligning with said existing hole a mounting aperture of said tape measure marking device, said tape measure marking device comprising a substantially rigid C-member having a central portion and two side portions, each side portion being adapted to be removably attachable to the tape measure so that said central portion is disposed adjacent an opening of the tape measure;

reinstalling said existing screw through said mounting aperture of said tape measure marking device and into said existing hole; and installing a mounting device through a second mounting aperture on the opposite side of the tape measure marking device so that said C-member is securely mounted to the tape measure on both sides thereof.

23. The method of claim 22, wherein said C-member includes a transverse arm at a second end thereof, said transverse arm having a threaded hole and having a set-screw therein, further comprising the step of tightening said set-screw against the tape measure.

* * * * *